United States Patent
Diab et al.

(10) Patent No.: US 7,293,182 B2
(45) Date of Patent: *Nov. 6, 2007

(54) METHODS AND APPARATUS FOR POWERING A DATA COMMUNICATIONS PORT

(75) Inventors: Wael William Diab, Menlo Park, CA (US); Roger Karam, Sunnyvale, CA (US); Premkumar Jonnala, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/211,205

(22) Filed: Aug. 25, 2005

(65) Prior Publication Data

US 2005/0283627 A1    Dec. 22, 2005

Related U.S. Application Data

(63) Continuation of application No. 10/090,224, filed on Mar. 4, 2002, now Pat. No. 6,952,785.

(51) Int. Cl.
    *G06F 1/26* (2006.01)
(52) U.S. Cl. .............. 713/300; 713/320; 713/322; 713/323; 713/330; 379/93.36; 379/169; 379/413; 455/13.4; 455/402; 700/197
(58) Field of Classification Search ........... 713/300, 713/310, 320, 323, 324
    See application file for complete search history.

(56) References Cited

U.S. PATENT DOCUMENTS

| | | | | |
|---|---|---|---|---|
| 5,550,917 A | | 8/1996 | Tallec | 379/442 |
| 5,784,237 A | | 7/1998 | Velez | 361/62 |
| 5,912,963 A | | 6/1999 | Begeja et al. | 379/221 |
| 5,936,442 A | * | 8/1999 | Liu et al. | 327/142 |
| 5,944,831 A | * | 8/1999 | Pate et al. | 713/324 |
| 6,055,641 A | * | 4/2000 | Konaka et al. | 713/320 |
| 6,233,235 B1 | | 5/2001 | Burke et al. | 370/356 |
| 6,260,151 B1 | * | 7/2001 | Omizo et al. | 713/324 |
| 6,317,839 B1 | * | 11/2001 | Wells | 713/320 |
| 6,345,047 B1 | | 2/2002 | Regnier | 370/352 |
| 6,357,011 B2 | | 3/2002 | Gilbert | 713/300 |

FOREIGN PATENT DOCUMENTS

JP             200214964 A         8/2000

* cited by examiner

*Primary Examiner*—Rehana Perveen
*Assistant Examiner*—Nitin C. Patel
(74) *Attorney, Agent, or Firm*—BainwoodHuang

(57) ABSTRACT

A data communications device includes a supervisory circuit, a power supply, and a power circuit. The power circuit includes a data communications port, a power supply connection coupled to the power supply, and a power controller coupled to the data communications port and the power supply connection. The power controller is configured to provide a power signal from the power supply connection to the data communications port in response to communication with the supervisory circuit. Upon loss of communication with the supervisory circuit, the power controller is configured to selectively continue to provide the power signal from the power supply connection to the data communications port when a local parameter has a first value, and discontinue providing the power signal from the power supply connection to the data communications port when the local parameter has a second value.

22 Claims, 10 Drawing Sheets

| TRANSACTION | DESCRIPTION | EFFECT ON POWER CONTROLLER 54-1 WHEN THE POWER CONTROLLER IS CONFIGURED TO RESPOND TO TRANSACTIONS UNIQUELY ADDRESSING THE POWER CONTROLLER AND TO TRANSACTIONS TO THE GLOBAL ADDRESS |
|---|---|---|
| 150-1 | ADDRESS = POWER CONTROLLER 54-1<br>COMMAND = SETUP REGISTERS | COMMUNICATION WITH SUPERVISORY SUBSYSTEM MAINTAINED (E.G., RESET COUNTER) |
| 150-2 | ADDRESS = POWER CONTROLLER 54-2<br>COMMAND = SETUP REGISTERS | NO RESPONSE |
| 150-3 | ADDRESS = POWER CONTROLLER 54-1<br>COMMAND = POWER PORT | COMMUNICATION WITH SUPERVISORY SUBSYSTEM MAINTAINED (E.G., RESET COUNTER) |
| 150-4 | ADDRESS = POWER CONTROLLER 54-1<br>COMMAND = READ STATUS | COMMUNICATION WITH SUPERVISORY SUBSYSTEM MAINTAINED (E.G., RESET COUNTER) |
| 150-5 | ADDRESS = GLOBAL<br>COMMAND = RESET COUNTER | COMMUNICATION WITH SUPERVISORY SUBSYSTEM MAINTAINED (E.G., RESET COUNTER) |
| 150-6 | ADDRESS = POWER CONTROLLER 54-3<br>COMMAND = SETUP REGISTERS | NO RESPONSE |

FIG. 10

METHODS AND APPARATUS FOR POWERING A DATA COMMUNICATIONS PORT

CROSS REFERENCE TO RELATED APPLICATIONS

This Patent Application is a Continuation of U.S. patent application Ser. No. 10/090,224 filed on Mar. 4, 2002, entitled, "METHODS AND APPARATUS FOR POWERING A DATA COMMUNICATIONS PORT", which issued on Oct. 4, 2005 as U.S. Pat. No. 6,952,785, whose contents are hereby incorporated by reference in their entirety.

BACKGROUND

Some communications devices derive power remotely (e.g., from relatively distant power sources through network cables) while other communications devices derive power locally (e.g., through local power supplies). For example, some voice-over-IP (VoIP) systems include a combination of remotely powered devices (e.g., IP phones, etc.) and locally powered devices (e.g., routers, switches, hubs, IP phones, etc.).

There are different approaches to remotely powering VoIP devices. In one approach, "mid-span" power injector devices are positioned on the lines (or cables) leading to the remotely powered devices, but not are positioned on the lines leading to the locally powered devices. The power injector devices allow communications signals (e.g., Ethernet signals) to pass therethrough, and simultaneously provide power on the lines without disturbing the communications signals (e.g., by using previously unused sets of twisted pair wires, by using used sets of wires, etc.).

In another approach, a particular data communications device (e.g., an Ethernet switch) is configured to (i) provide a power signal on the lines leading to the remotely powered devices and (ii) not provide the power signal on the lines leading to the locally powered devices. Accordingly, the remotely powered devices receive the power signal from the data communications device, and the locally powered devices do not receive any power signal from the data communications device.

One conventional Ethernet switch includes a set of supervisory circuit boards and multiple line cards. The set of supervisory circuit boards run software in order to discover whether devices on the other ends of the lines connected to the line cards are remotely powered or locally powered. The set of supervisory circuit boards directs the line cards to provide a power signal to the remotely powered devices, but not to provide the power signal to the locally powered devices. If someone unplugs a remotely powered device from a particular line, the set of supervisory circuit boards can discover the removal of the remotely powered device (e.g., by sensing the particular line) and subsequently direct the line card for that line to no longer provide the power signal to that line. Accordingly, if a locally powered device is later plugged into the same line, there is no power signal on that line that could otherwise damage a locally powered device.

SUMMARY

Unfortunately, there are deficiencies to the above-described conventional Ethernet switch. For example, since the set of supervisory circuit boards run software, it is possible that the set of supervisory circuit boards may crash leaving the line cards in programmed states of providing the power signal on lines leading to remotely powered devices, and not providing any power signal on lines leading to locally powered devices. If a line carrying the power signal is unplugged from a remotely powered device while the set of supervisory circuit boards remains crashed, the set of supervisory circuit boards will be unable to discover removal of the remotely powered device and will be unable to subsequently direct the line card for that line to no longer provide the power signal on that line. As a result, the line card for that line will continue to provide the power signal. Accordingly, a user could inadvertently cause damage to a locally powered device by subsequently plugging that same line (i.e., the line carrying the power signal) into the locally powered device. In particular, the amount of power (e.g., 15 Watts or roughly 400 mA maximum at 44 V) could be substantial enough to damage expensive equipment (e.g., a laptop or notebook computer, a router, etc.) which requires local power but which would otherwise receive the power signal from the line card.

The invention is directed to techniques for powering a data communications port based on whether communication exists with a supervisory circuit (e.g., an external supervisory circuit board running software). If such communication exists, control over whether to provide a power signal to the data communications port can be dictated by the supervisory circuit (e.g., by discovery operations performed by the supervisory circuit). However, if communication with the supervisory circuit is lost for a period of time (e.g., due to a software crash of the supervisory circuit board), control over whether to provide the power signal can then be determined by other means. For example, a power signal can then be selectively (i) discontinued (e.g., in order to prevent against inadvertently providing the power signal to a locally powered device) or (ii) provided (e.g., in special situations that require the power signal to be maintained at all cost) based on the value of a parameter (e.g., the contents of a local memory location). The parameter value can be the result of performing a discovery operation which is independent of the supervisory circuit (e.g., a locally performed operation which is independent of any discovery previously made by a supervisory circuit board running software). Alternatively, the parameter value can be pre-programmed (e.g., by a system administrator). Accordingly, if communication with the supervisory circuit is lost, control over the power signal can be maintained in a local manner. Moreover, if communication with the supervisory circuit is regained, the supervisory circuit can retake control thus alleviating the need to locally control whether to provide the power signal based on the value of the parameter.

One embodiment of the invention is directed to a data communications device (e.g., an Ethernet switch, a router, a hub, etc.) which includes a supervisory circuit, a power supply, and a power circuit coupled to the supervisory circuit and the power supply. The power circuit includes a data communications port, a power supply connection coupled to the power supply, and a power controller coupled to the data communications port and the power supply connection. The power controller is configured to provide a power signal from the power supply connection to the data communications port in response to communication with the supervisory circuit. If the controller loses communication with the supervisory circuit (e.g., due to a software crash by the supervisory circuit), the power controller is configured to selectively (i) continue to provide the power signal from the power supply connection to the data communications port when a local parameter has a first value, and (ii) discontinue providing the power signal from the power supply connection to the data communications port when the local parameter has a second value.

Accordingly, the power signal can be controlled by the value of the local parameter (e.g., a result of an independent discovery operation, a setting within a control register, etc.) in the event of a communications failure between the power circuit and the supervisory circuit. As a result, if equipment which does not need remote power is connected to the data communications port while the supervisory circuit is unavailable, damage to that equipment can be avoided by controlling the power signal based on the local parameter (e.g., performing discovery from the power circuit and then providing or not providing the power signal, simply making the power signal unavailable, etc.).

In one arrangement, the supervisory circuit provides a series of periodic broadcast messages to a global address in order to communicate with the power circuit. These messages to the global address operate as a "heartbeat" or "watchdog signal" by restarting a counter in the power circuit upon each of the series of periodic broadcast messages. Communications with the supervisory circuit is deemed lost if the counter expires (i.e., if a particular amount of time passes without receipt of a broadcast message). The use of the global address enables the supervisory circuit to maintain communication with multiple power circuits simultaneously with minimal signal traffic. Additionally, the size and counting rate of the counter can be set so as not to overly burden the resources of the data communications device, but nevertheless minimize the possibility of a user inadvertently connecting a locally powered device to a data communications port and damaging that device with a remote power signal.

In one arrangement, the power controller of the power circuit is further configured to restart the counter in response to a message from the supervisory circuit which uniquely addresses the power circuit (e.g., an individual write to a particular address of the power circuit, or simply any communication specifically directed to the power circuit). Accordingly, normal activity such as standard communications between the supervisory circuit and the power circuit can be sufficient to maintain communications between the supervisory circuit and the power circuit thus alleviating the need for the series of broadcast messages from the supervisory circuit unless there is no other activity.

The features of the invention, as described above, may be employed in communications systems, devices and methods as well as other computer-related components such as those of Cisco Systems, Inc. of San Jose, Calif.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 10 is a table diagramming the effect of the sequence of transactions of FIG. 9 on a particular power controller of the data communications device of FIG. 1.

DETAILED DESCRIPTION supervisory circuit (e.g., an external supervisory circuit board running software). If such communication exists, control over whether to provide a power signal to the data communications port can be dictated by the supervisory circuit (e.g., by discovery operations performed by the supervisory circuit). However, if communication with the supervisory circuit is then lost for a period of time (e.g., due to a software crash of the supervisory circuit board), control over whether to provide the power signal can subsequently be determined by other means. For example, a power signal can then be selectively (i) discontinued (e.g., in order to prevent against inadvertently providing the power signal to a locally powered device) or (ii) provided (e.g., in special situations that require the power signal to be maintained at all cost), based on the value of a parameter (e.g., the contents of a local memory location). The parameter value can be the result of performing a discovery operation which is independent of the supervisory circuit (e.g., a locally performed operation which is independent of any discovery previously made by a supervisory circuit board running software). Alternatively, the parameter value can be a pre programmed setting (e.g., by a system administrator). As such, if communication with the supervisory circuit is lost, control over the power signal can be maintained in a local manner. Furthermore, if communication with the supervisory circuit is regained, the supervisory circuit can retake control thus alleviating the need to locally control whether to provide the power signal based on the value of the parameter.

Figure 1:
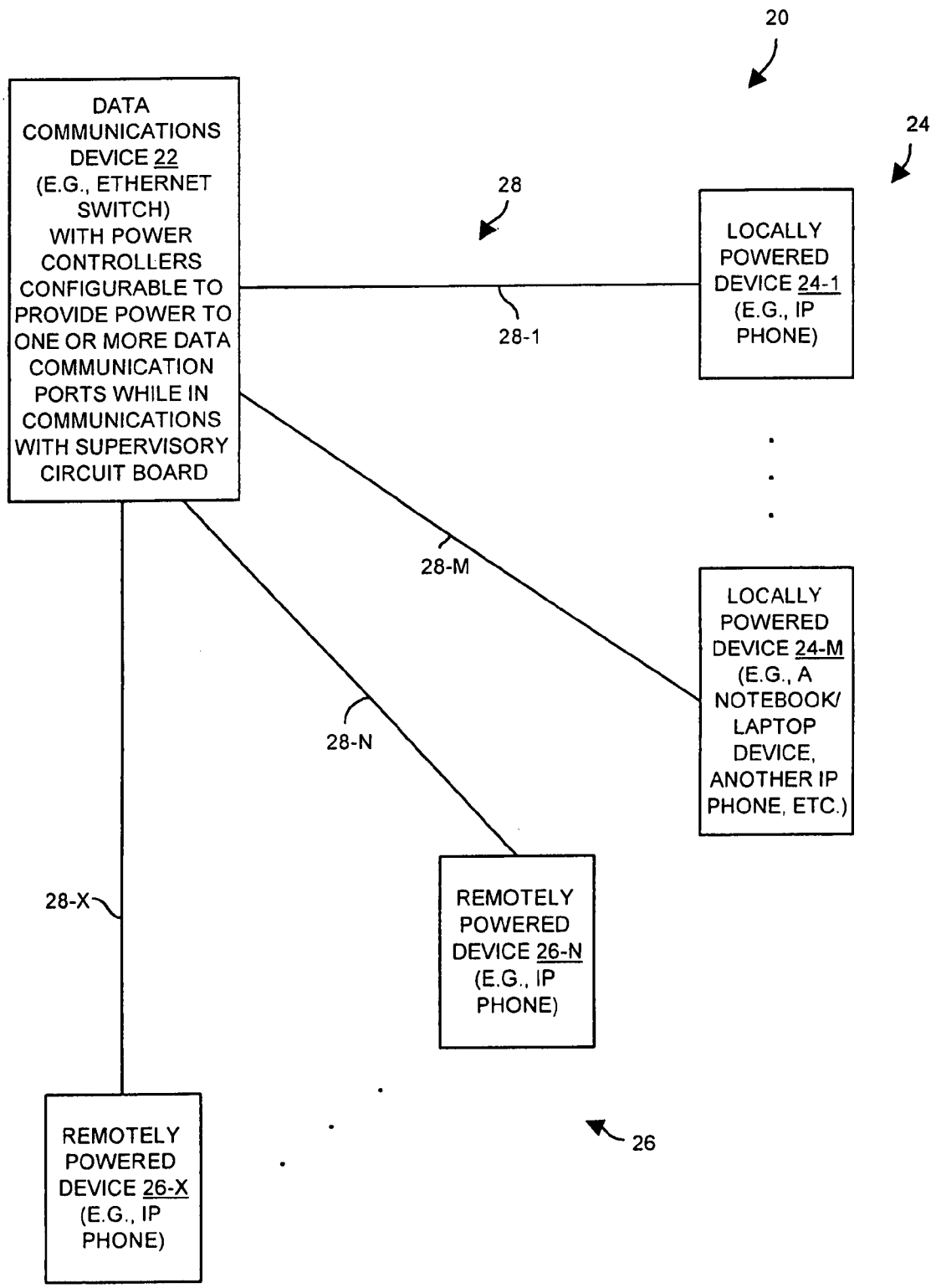
FIG. 1 is a block diagram of a system of communications devices which is suitable for use by the invention.

FIG. 1 shows a communications system 20 which is suitable for use by the invention. The communications system 20 includes a data communications device 22 (e.g., an Ethernet switch), a set of locally powered devices 24-1, . . . , 24-M (collectively, locally powered devices 24), a set of remotely powered devices 26-N, . . . , 26-X (collectively, remotely powered devices 26) and connection lines (or cables) 28-1, . . . , 28-X (collectively, lines 28) which connect the devices 24, 26 to the data communications device 22. Examples of locally powered devices which are suitable as the devices 24 include locally powered IP phones and notebook computers. An example of a remotely powered device which is suitable as a device 26 is a remotely powered IP phone. In one arrangement, the lines 28 include standard communications cables (e.g., CAT 5 cable, CAT 6 cable, CAT 3 cable, RJ45 connectors, etc.).

As will be described in further detail below, the data communications device 22 includes a set of supervisory circuits (e.g., multiple supervisory circuit boards for fault tolerance) and a set of power controllers. Each power controller is configurable to provide or not provide a power signal to one or more data communications ports based on transactions (i.e., commands) from the set of supervisory circuits. In one arrangement, each line 28 is capable of providing approximately 15 Watts (roughly 400 mA maximum at 44 V). If communication with the set of supervisory circuits is lost, each power controller can switch its operation from a dependent mode in which it takes orders for controlling the lines 28 from the set of supervisory circuits, to an independent mode in which it carries on based on its own set of operating procedures.

For example, if the supervisory circuit boards become unavailable due to a software crash, the power controllers can perform their own discovery on the lines 28 to individually determine whether to provide or not provide a power signal (e.g., −48 Volts) on each line 28. Accordingly, the power controllers will not be left vulnerable for an extended window of time where a user could unplug a remotely powered device and plug a locally powered device 24 in its place thus damaging the locally powered device (e.g., a relatively expensive laptop) as in conventional communications systems. As a result, the data communications device 22 will not inadvertently damage a locally powered device 24 (e.g., a laptop computer) on one of the lines 28, even if that locally powered device 24 is connected to a line 28 that previously carried a power signal to a remotely powered device 26 prior to the software crash. Further details of the invention will now be provided with reference to FIG. 2.

Figure 2:
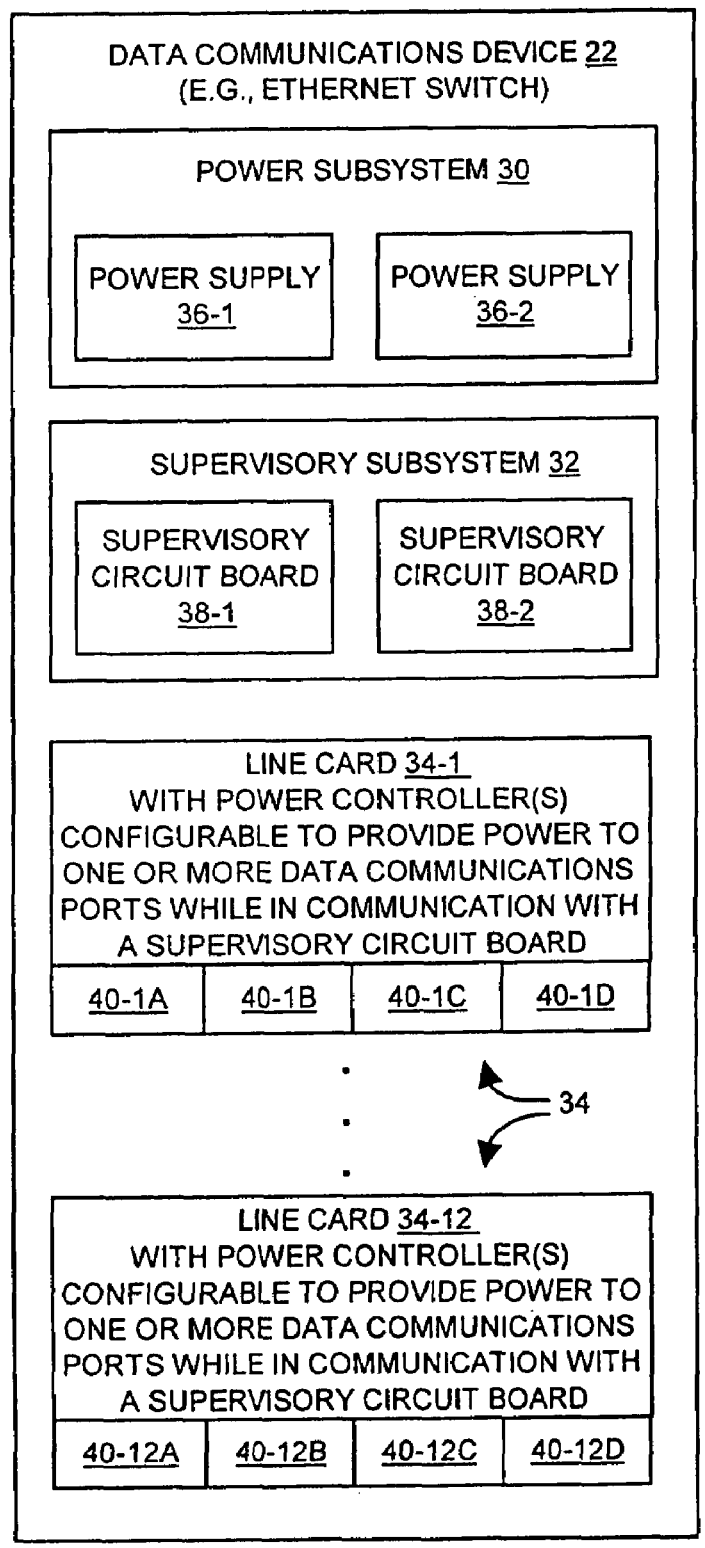
FIG. 2 is a block diagram of a data communications device of the system of FIG. 1.

FIG. 2 is a block diagram of a configuration which is suitable for use by the data communications device 22 of FIG. 1. In this configuration, the data communications device 22 includes a power subsystem 30, a supervisory subsystem 32, and a set of line cards 34. The power subsystem 30 includes multiple power supplies 36-1, 36-2 (collectively, power supplies 36) for fault tolerance. Each power supply 36 can provide a power signal for remotely powering the remotely powered devices 26 (also see FIG. 1).

The supervisory subsystem 32 includes multiple supervisory circuit boards 38-1, 38-2 (collectively, the supervisory circuit boards 38). Each supervisory circuit board 38 includes a supervisory circuit which is capable of communicating with the line cards 34. Typically, one supervisory circuit controls the operation of all of the line cards 34, and the other sits as a hot backup in the event the first supervisory circuit fails (e.g., has a software crash). In the event of a supervisory circuit failure, control switches over from the failed supervisory circuit to the backup supervisory circuit.

By way of example only, each line card 34 has four data communications ports 40. For instance, the line card 34-1 has data communications ports 40-1A, 40-1B, 40 1C and 40-1D (collectively, the data communications ports 40). Each data communications port 40 (e.g., a 10/100 Ethernet port, a 1000BT Ethernet port, any combination thereof, etc.) is capable of connecting to a line 28 (see FIG. 1) which leads to a device 24, 26. A power controller on each line card 34 is configurable to provide a power signal from the power subsystem 30 to one or more of the data communications ports 40. Accordingly, the power controller can provide power to a remotely powerable device 26 that connects to one of its data communications ports 40 through a line 28.

In the data communications device 22 of FIG. 2, there are 12 line cards by way of example only resulting in a total of 48 data communications ports 40 which can be individually configured to carry or not carry a power signal from the power subsystem 30. Further details of the invention will now be provided with reference to FIG. 3.

Figure 3:
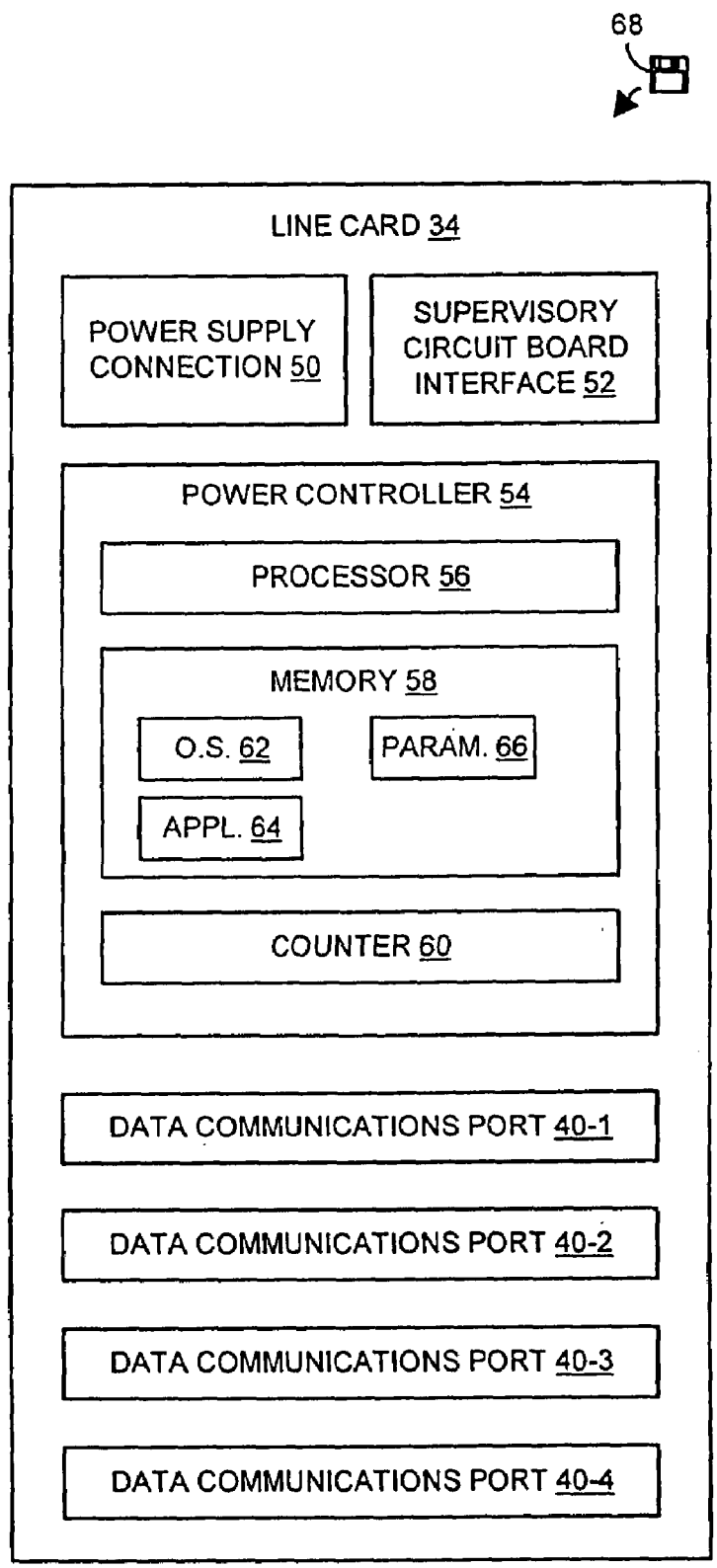
FIG. 3 is a block diagram of a line card of the data communications device of FIG. 2.

FIG. 3 is a block diagram of a line card 34 of the data communications device 22 of FIG. 2. The line card 34 includes a power supply connection 50, a supervisory circuit board interface 52, a power controller 54 and four data communications ports 40. In one arrangement, the power controller 54 includes a set of specially programmed integrated circuits (ICs) (e.g., Field-Programmable Gate Arrays, Application Specific ICs, etc.). In another arrangement, the power controller 54 includes a processor 56, memory 58 and a counter 60 with the memory 58 being capable of storing an operating system 62, an application 64 and a local parameter 66 (the operating system 62 and application 64 being supplied by a computer program product 68 such as a diskette, a tape, a CD ROM, etc.). In yet another arrangement, the power controller 54 is formed by a combination of programmable ICs and a microprocessor.

During operation, the power controller 54 operates in one of two modes: an independent mode and a dependent mode. When the power controller 54 is in independent mode (e.g., immediately after a power-up sequence), the power controller 54 operates in accordance with its own programming. That is, the power controller 54 operates in a self-management mode. For example, the power controller 54 can run its own software (e.g., the application 64) to discover whether the data communications ports 40 connect to any remotely powerable devices (e.g., IP phones). If the power controller 54 discovers that a data communications port 40 connects to a remotely powerable device, the power controller 54 provides a power signal from the power subsystem 30 (i.e., from the power supply connection 50 which connects to the power supplies 36, also see FIG. 2) to that data communications port 40. The power controller 54 can store its knowledge of the data communications port 40 as the contents of the local parameter 66, and periodically retest the data communications port 40 (and rewrite the local parameter 66) to verify that the remotely powerable device remains connected to the data communications port 40. If the power controller 54 discovers that the remotely powerable device is removed, the power controller 54 can discontinue providing the power signal on to the data communications port 40 in order to avoid potentially damaging another device (e.g., a locally powered notebook computer) that subsequently connects to the same data communications port 40.

At some point, the supervisory circuit boards 38 of the supervisory subsystem 32 (also see FIG. 2) come online (e.g., after self-test and after booting software). At this point, the supervisory subsystem 32 is capable of configuring the power controllers 54. For example, a supervisory circuit board 38 of the supervisory subsystem 32 can perform discovery operations to find out which of the lines 28 connect to locally powered devices 24 and remotely powerable devices 26, and then direct particular power controllers 54 to provide power signals only on the lines 28 leading to the remotely powerable device 26. To this end, the supervisory subsystem 32 issues transactions, i.e. commands, to the power controllers 54 of the line cards 34. The power controllers 54 respond to this communication by exiting the independent modes of operation and by entering dependent modes of operation in which the supervisory subsystem 32 controls the operation of the power controllers 54. While the power controllers 54 are in dependent mode, the supervisory subsystem 32 can direct the power controllers 54 to provide or not provide a power signal to the data communications ports 40. In one arrangement, the supervisory subsystem 32 periodically performs discovery on the lines 28 and sends commands to configure the power controllers 54 to provide or not provide the power signal to the data communications ports 40.

As long as the supervisory subsystem 32 remains in communication with the power controllers 54, the power controllers 54 operate dependently based on the transactions issued by the supervisory subsystem 32. However, if the power controllers 54 lose communication with the supervisory subsystem 32 for a predetermined amount of time, the power controllers 54 re-enter independent mode modes of operation to regain control (e.g., perform discovery independently of the supervisory subsystem 32 and locally control whether to provide power signals on the lines 28).

Each power controller 54 is capable of individually determining whether communication has been lost with the supervisory subsystem 32 (e.g., due to a failure of both supervisory circuit boards 38, see FIG. 1). In one arrangement, the counter 60 of each power controller 54 operates as a watchdog device. In particular, the counter 60 begins counting after the power controller 54 receives an indication that supervisory subsystem 32 is in communication with the power controller 54. Each time the power controller 54 receives another indication that the supervisory subsystem 32 is still in communication with the power controller 54, the counter 60 resets, i.e., begins counting again. As long as the counter 60 of the power controller 54 does not expire, the power controller 54 considers communication with the supervisory subsystem 32 to be maintained. However, if the counter 60 expires (i.e., if the predetermined amount of time transpires without receiving a communication from the supervisory subsystem 32 (e.g., due to a crash of both supervisory circuit boards 38), the power controller 54 exits dependent mode and re-enters independent mode as described above. The power controller 54 then remains in independent mode until communication with the supervisory subsystem 32 is regained (e.g., until the supervisory circuit boards 38 come back online).

It should be understood that the power controllers 54 can be configured in different ways to consider when communication is maintained (or lost) with the supervisory subsystem 32. In one arrangement, each power controller 54 considers communication with the supervisory subsystem 32 to be maintained only in response to individual messages from the supervisory subsystem 32 which uniquely address that power controller 54 (e.g., in response to individual write transactions which uniquely address a memory location associated with resetting the counter 60 of that power controller 54). In another arrangement, each power controller 54 considers communication with the supervisory subsystem 32 to be maintained in response to individual messages or global messages (e.g., a broadcasted write transaction which addresses a memory location associated with resetting the counter 60 of each power controller 54). In yet another arrangement, each power controller 54 also considers communication with the supervisory subsystem 32 to be maintained in response to any other types of transactions which target that power controller 54 (e.g., miscellaneous commands for performing other functions but which are also used to reset the counter 60 of that power controller 54). In one arrangement, the power controllers 54 are flexible and can be configured to reset the counters 60 in response to various combinations of these inputs. A particular example will now be provided with reference to FIG. 4.

Figure 4:
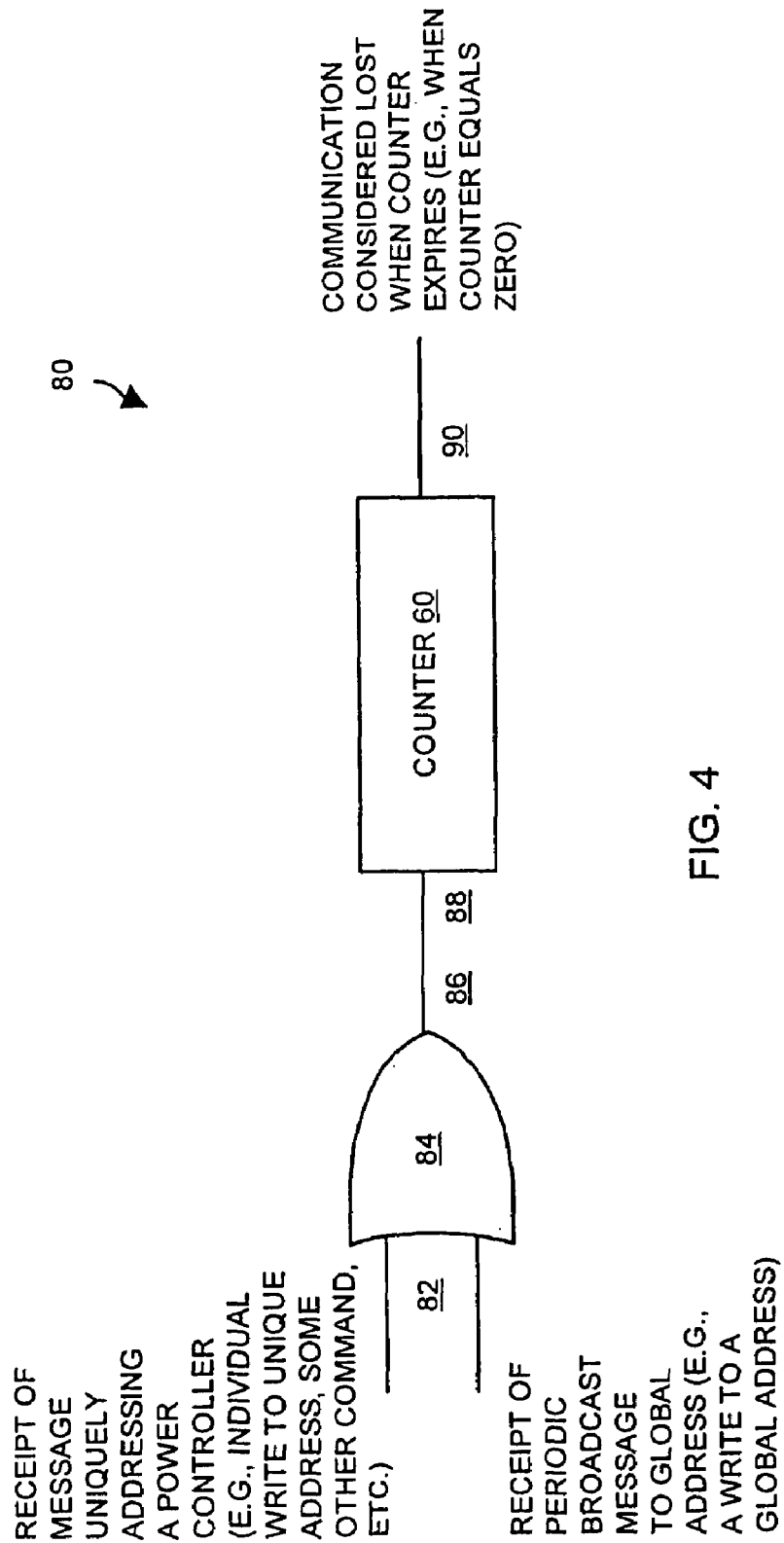
FIG. 4 is a logical representation of a counter operation of the line card of FIG. 3.

FIG. 4 logically illustrates a counter resetting configuration 80 for a power controller 54 which considers communication to be maintained with the supervisory subsystem 54 in response to either messages which uniquely address the power controller 54 (e.g., an individual write command to a unique address associated with resetting the counter 60, other commands, etc.) or messages which globally address the power controllers 54 (e.g., a write command which addresses a memory location on all power controllers 54 simultaneously). This functionality is illustrated by the inputs 82 to a logical OR operation 84. Receipt of either type of message causes the output 86 of the logical OR operation 84 to send a signal 80 to the counter 60 which resets the counter 60. The counter 60 has an output 90 which provides a first value, i.e., a non expiration value, as long as the counter 60 does not expire (e.g., as long as the counter 60 does not count down to zero). However, the output 90 provides a second value, i.e., an expiration value, if the counter expires without being reset within a predetermined amount of time.

It should be understood various counter configurations are suitable for use for the counter 60 (e.g., a counter that increments, decrements, etc.). If the counter 60, is reset by another indication of supervisory subsystem activity prior to expiration, the controller 54 remains in dependent mode. However, if the counter 60 expires before it is reset by another indication of supervisory subsystem activity (e.g., if the contents of the counter 60 ever equal zero), the controller 54 considers communication with the supervisory subsystem 32 lost, and reverts back to independent mode. Accordingly, if the supervisory subsystem 32 should become unavailable (e.g., if both supervisory circuit boards 38 should crash), the power controllers 54 are not locked into a state in which they are forced to maintain power signals on certain lines 28 which could potentially damage a locally powered device which later connects to one of those lines 28. Rather, the power controllers 54 revert back into their independent modes as a safeguard mechanism. Under independent mode, the power controllers 54 can perform their own specialized operations, e.g., the power controllers 54 can perform discovery on their own and then provide or not provide a power signal on each data communications port 40 until the supervisory subsystem 32 comes back (e.g., until the supervisory circuit reboot and reclaim control of the power controllers 54).

It should be understood that the power controllers 54 are robust and enable a variety of configurations. For example, in one arrangement, the power controllers 54 are capable of periodically performing their own discovery when in independent mode. The power controllers 54 store the results of such discovery in the local parameters 66 which direct the power controllers 54 to provide or not provide the power signal to particular data communications ports 40. In another arrangement, the local parameters 66 are set directly by a user (e.g., a systems administrator) for customized applications. For instance, there may be a requirement imposed for a particular line 28 requiring a power signal to be maintained on that line 28 at all cost (e.g., for fault tolerance), or never to be provided on that line 28 at all cost. In these arrangements, the user can simply program how the power controllers 54 operate on particular data communications ports 40 by expressly setting the local parameters 66 for the power controllers 54 controlling those ports 40. A summary of how a power controller 54 operates when initially communicating with the supervisory subsystem 32 and subsequently losing communication with the supervisory subsystem 32 will now be provided with reference to FIG. 5.

Figure 5:
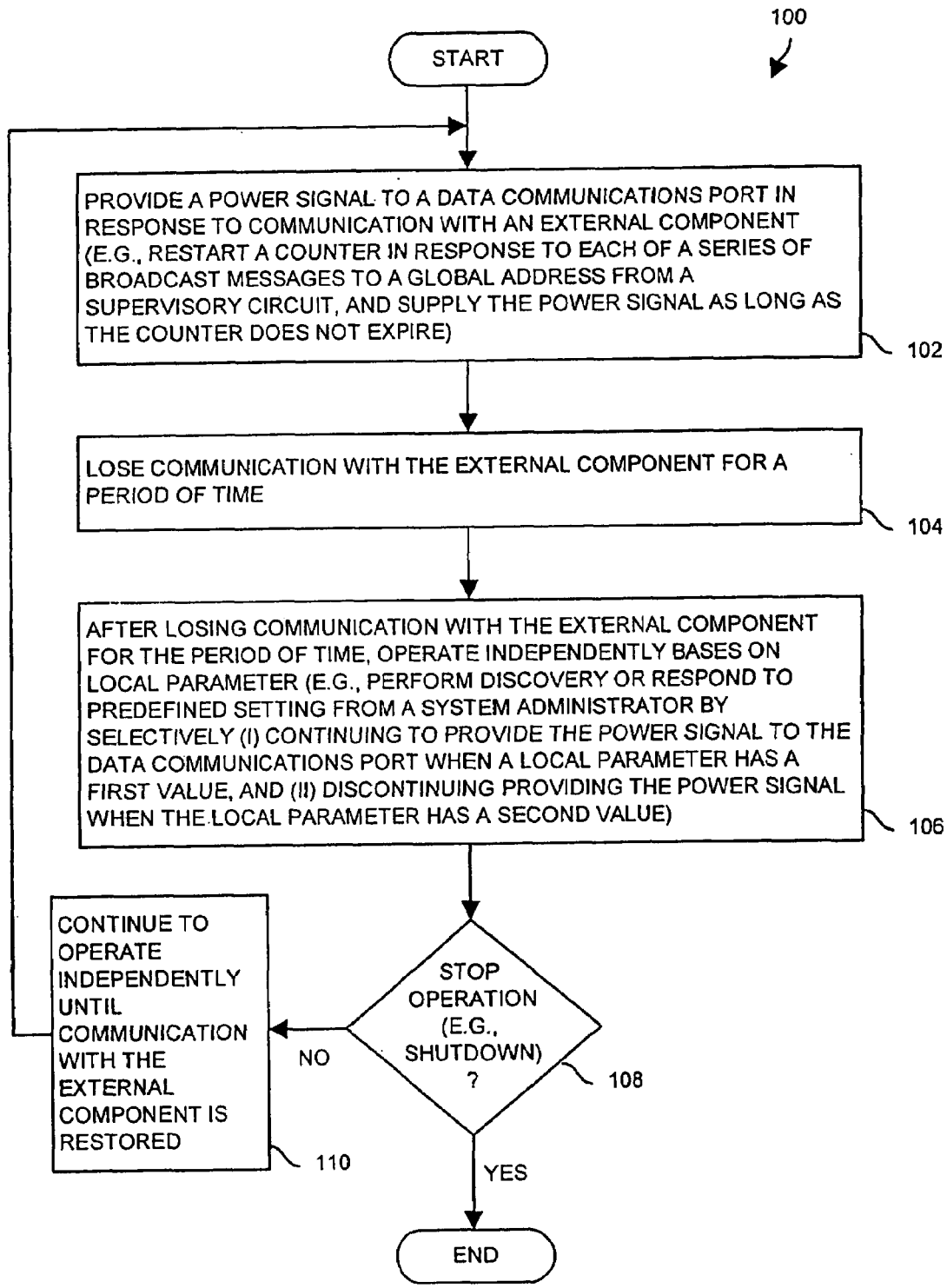
FIG. 5 is a flowchart of a procedure which is performed by the line card of FIG. 3.

FIG. 5 is a flowchart of a procedure 100 which is performed by a power controller 54 when providing a power signal to a data communications port 40 and then losing communication with the supervisory subsystem 32. In step 102, the power controller 54 operates in dependent mode in response to communication with an external component, i.e., the supervisory subsystem 32. In particular, the power controller 54 provides a power signal to the data communications port 40 and is under direction of the supervisory subsystem 32. In one arrangement, the power controller 54 restarts the counter 60 in response to each of a series of broadcast messages to a global address from the supervisory subsystem 32 or in response to specific transactions (e.g., commands, activity, etc.) with the supervisory subsystem 32. The power controller 54 continues to provide the power signal as long as the counter 60 does not expire.

In step 104, the power controller 54 loses communication with the external component for a period of time. In one arrangement, the counter 60 expires and a predetermined threshold amount of time passes without any activity from the supervisory subsystem (e.g., due to a software crash of the supervisory circuit boards 38).

In step 106, the power controller 54 transitions into independent mode after losing communication with the external component. That is, the power controller 54 gracefully switches over to a self-managing mode of operation in which it operates independently of the supervisory subsystem 32, i.e., based on a local parameter 66 (also see FIG. 3). In particular, the power controllers 54 selectively (i) continues to provide the power signal to the data communications port 40 when the local parameter 66 has a first value (e.g., SET) and (ii) discontinues providing the power signal to the data communications port 40 when the local parameter 66 has a second value (e.g., CLEAR). For example, the contents of the local parameter 66 can contain a result of discovery which is periodically performed on the data communications port 40 by the power controller 54 itself. As a result, the possibility of damaging a locally powered device 24 which is later connected to the data communications port 40 is avoided. Thus, the power controller 54 will not be left vulnerable for an extended amount of time where a user could unplug a remotely powered device and plug a locally powered device 24 in its place thus damaging the locally powered device as in conventional VoIP systems.

In step 108, the power controller 54 determines whether to terminate operation. For example, the power controller 54 can receive a shutdown, reset or power-down signal which terminates its operation. If the power controller 54 determines that it should not stop operation, step 108 proceeds to step 110.

In step 110, the power controller 54 continues to operate independently until communication with the external component (namely, the supervisory subsystem 32) is restored. When such communication is restored, step 110 proceeds back to step 102 so that the power controller 54 operates in dependent mode. That is, the power controller 54 provides the power signal based on communication with the supervisory subsystem 32.

Figure 6:
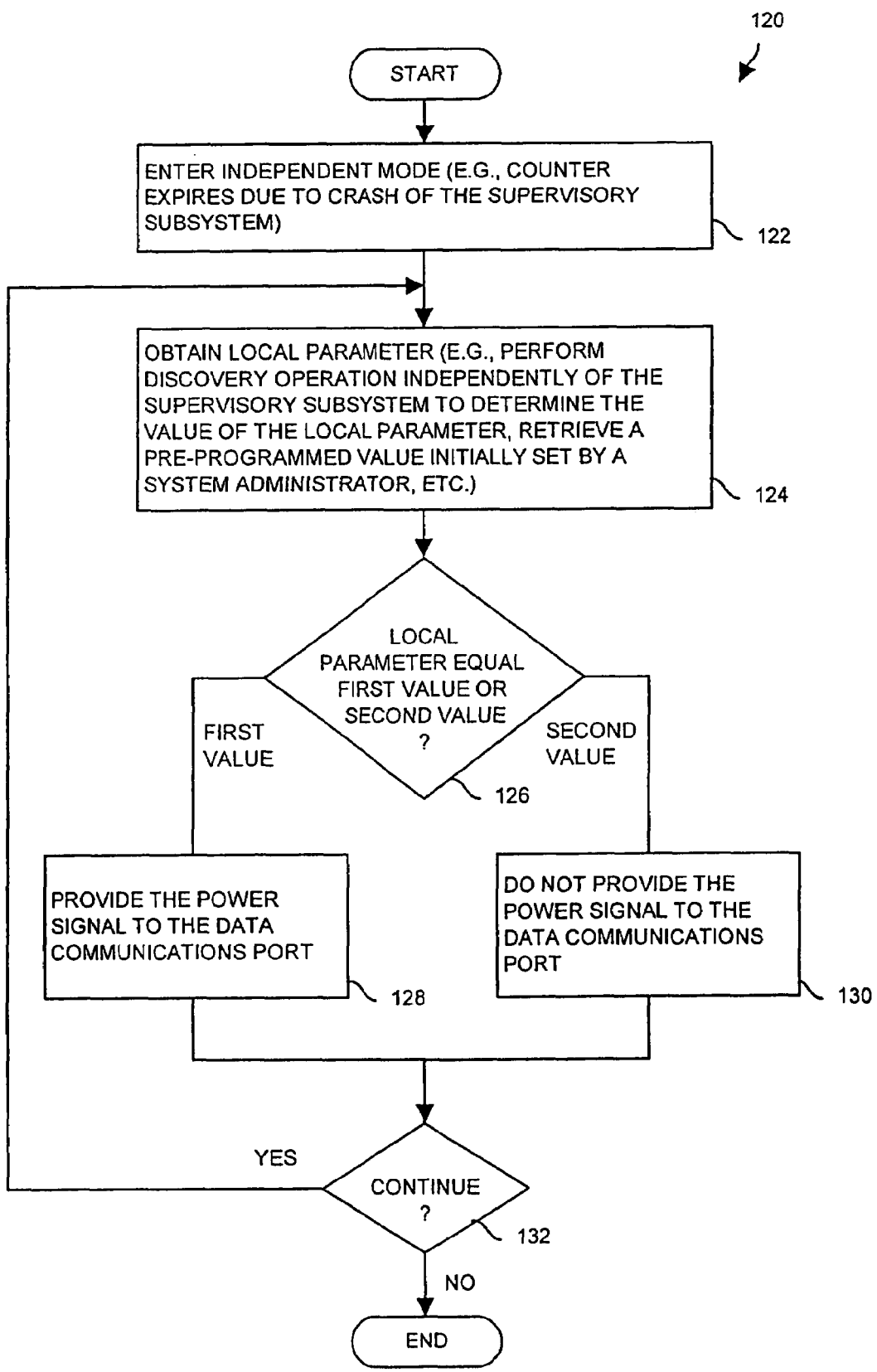
FIG. 6 is a flowchart of a particular step of the procedure of FIG. 5.

FIG. 6 is a flowchart of a procedure 120 which is suitable for use as step 106 in FIG. 5. In step 122, the power controller 54 enters independent mode (e.g., due to expiry of the counter 60). For example, the supervisory circuits within the supervisory subsystem 32 crash and no longer provide any messages to the power controller 54 for a predetermined amount of time.

In step 124, the power controller 54 obtains the local parameter 66 (also see FIG. 3). In one arrangement, the power controller 54 performs a discovery operation which is independent of the supervisory subsystem 32. The discovery operation result (i.e., the contents of the local parameter 66) indicates whether a remotely powerable device exists on the line 28 that connects to the data communications port 40 under control of the power controller 54. In another arrangement, the power controller 54 reads a value which was pre programmed by a user (e.g., a system administrator).

In step 126, the power controller 54 examines the contents of the local parameter 66. If the local parameter 66 has a first value, step 126 proceeds to step 128. If the local parameter 66 has a second value, step 126 proceeds to step 130.

In step 128, the power controller 54 provides the power signal to the data communications port 40 in response to the local parameter 66 having the first value. Accordingly, the power controller 54 can maintain operation of a remotely powered device 26 connected to the data communications port 40.

In contrast, in step 130, the power controller 54 does not provide the power signal to the data communications port 40 in response to the local parameter 66 having the second value. Accordingly, the power controller 54 can avoid potentially damaging a locally powered device 24 which is subsequently connected to the data communications port 40.

In step 132, the power controller 54 determines whether to continue (e.g., whether it should stop in response to a shutdown signal). If the power controller 54 determines that it should continue operation, step 132 proceeds back to step 124 to re read the local parameter 66 and operate accordingly. Further details of the invention will now be provided with reference to FIG. 7.

Figure 7:
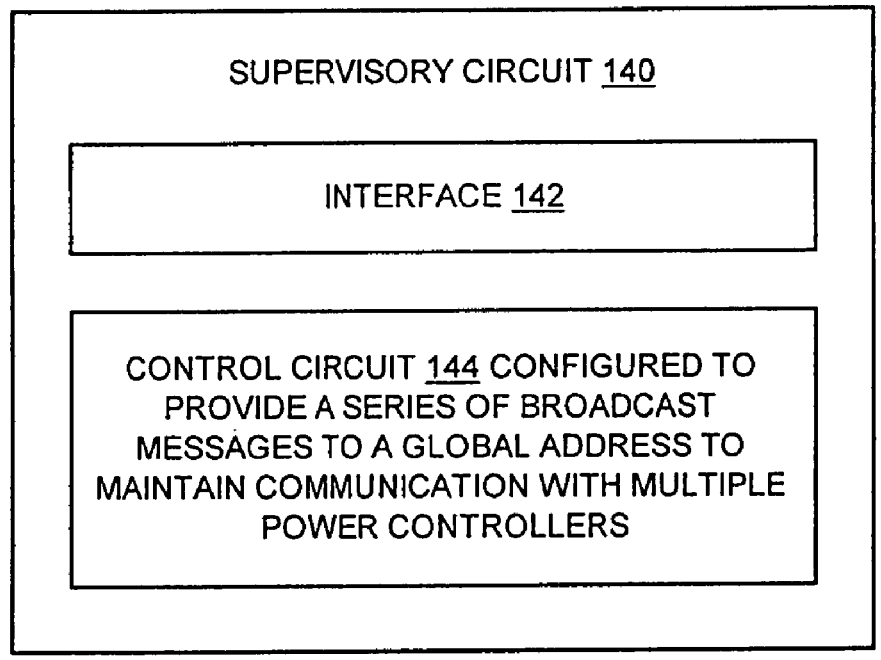
FIG. 7 is a block diagram of a supervisory circuit board of the data communications device of FIG. 2.

FIG. 7 is a block diagram of a supervisory circuit 140 which is suitable for use in each of the supervisory circuit boards 38 of the supervisory subsystem 34 of FIG. 2. The supervisory circuit 140 includes an interface 142 and a control circuit 144. The control circuit 144 is configured not only to communicate with the power controllers 54 on an individual basis (e.g., directly using messages which uniquely address the power controllers 54), but also to communicate with all of the power controllers 54 simultaneously (e.g., using a series of periodic broadcasted messages to a global address).

The use of broadcast messages enables the supervisory circuit 140 to provide a "heartbeat" or "watchdog signal" which restarts the counter 60 in the power controllers 54 of each line card 34 upon each broadcast message. Communications with the supervisory circuit 140 is deemed lost if the counter 60 expires (i.e., if a particular amount of time passes without receipt of a broadcast message). The use of the global address (which can be a hidden address that is not published for use by a user) enables the supervisory circuit 140 to maintain communication with multiple power controllers 54 simultaneously with minimal signal traffic. This is a quick and efficient communications mechanism. Furthermore, the counting rate and the size of the counter 60 can be set so as not to overly burden the resources of the data communications device 22, but nevertheless minimize the possibility of a user inadvertently connecting a locally powered device 24 to a data communications port 40 and damaging that device 24 with a remote power signal. For example, the amount of time for the counter 60 to expire can be made so short that there would not be enough time after the supervisory subsystem 30 fails for a user to disconnect a line 28 from a remotely powered device 26, and plug that line 28 into a locally powered device 24 thus avoiding potentially damaging the locally powered device 24.

Figure 8:
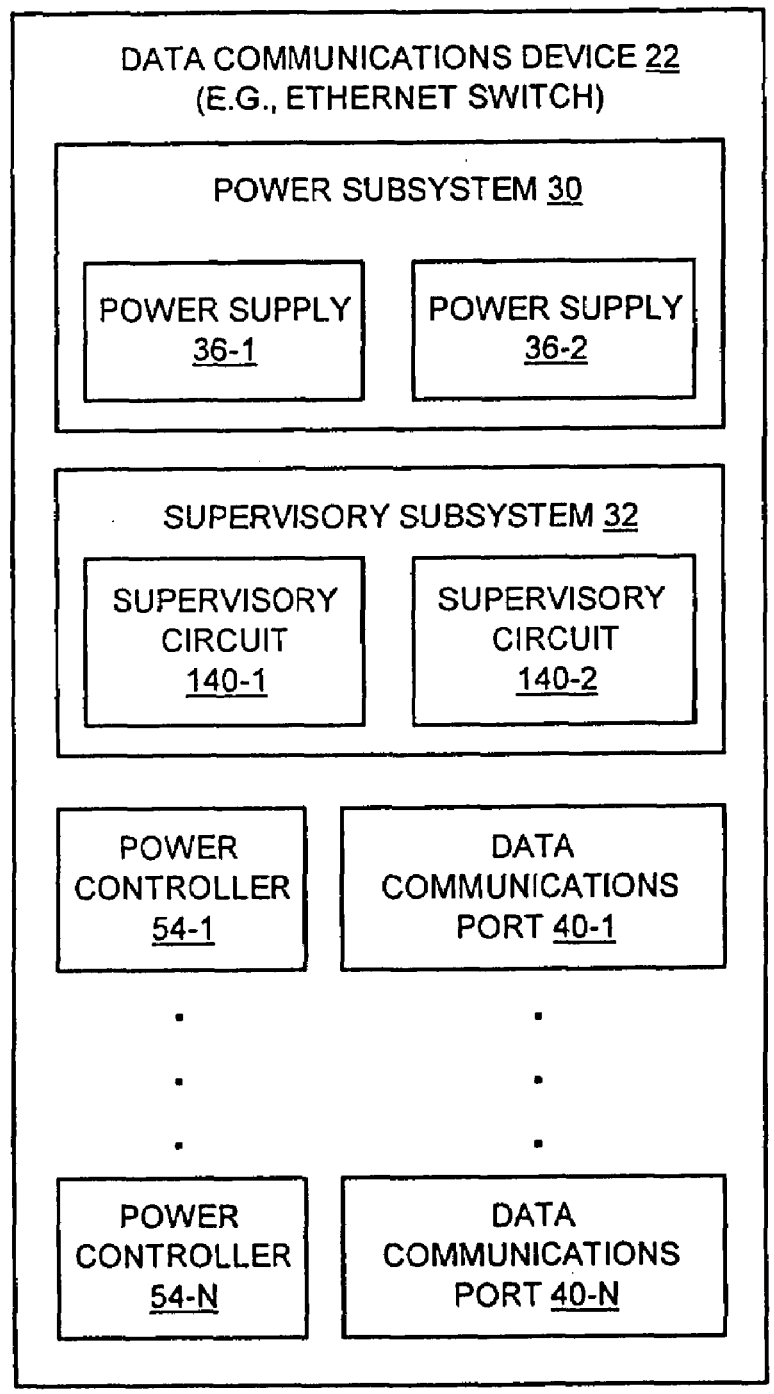
FIG. 8 is a block diagram of a data communications device which is an alternative to that of FIG. 2 and which is suitable for use by the system of FIG. 1.

FIG. 8 is a block diagram of an alternative configuration for the data communications device 22. In the configuration of FIG. 8, the data communications device 22 has a "pizza-box" configuration in which the supervisory circuits 140 (i.e., the supervisory circuits 140-1, 140-2) of the supervisory subsystem 32 and the power controllers 54 are more closely integrated (e.g., combined on the same circuit board). Optionally, the power subsystem 30 and/or the data communications ports 40 (i.e., the data communications ports 40-1, . . . , 40-N) are closely integrated (e.g., on the same circuit board) as well. In this configuration, the supervisory circuits 140-1, 140-2 (also see FIG. 7) can reside in circuitry which is adjacent (e.g., neighboring ICs) to the circuitry forming the power controllers 54.

Additionally, each power controller 54 can be implemented as a processor and memory with the processor running code stored in the memory. Alternatively, each power controller 54 can be implemented as one or more specialized ICs (e.g., FPGAs, ASICs, analog circuitry, combinations thereof, etc.)

In the configuration of FIG. 8, if the power controllers 54 are in communication with the supervisory subsystem 32, the power controllers 54 run in dependent mode, i.e., under control of the supervisory subsystem 32. However, if the power controllers 54 lose communication with the supervisory subsystem 32 for a predetermined amount of time (e.g., the counters 60 expire), the power controllers 54 transition to their independent mode to run independently of the supervisory subsystem 32 as described above for the configuration of FIGS. 2 and 3.

It should be understood that there are multiple supervisory circuits 140-1, 140-2 by way of example only for fault tolerance. In other arrangements, there is only one supervisory circuit 140, i.e., the supervisory circuit 140 does not have a backup so that the power controllers 54 switch to independent mode if the lone supervisory circuit 140 fails. Further details of the invention will now be described with reference to an example and FIGS. 9 and 10.

Figure 9:
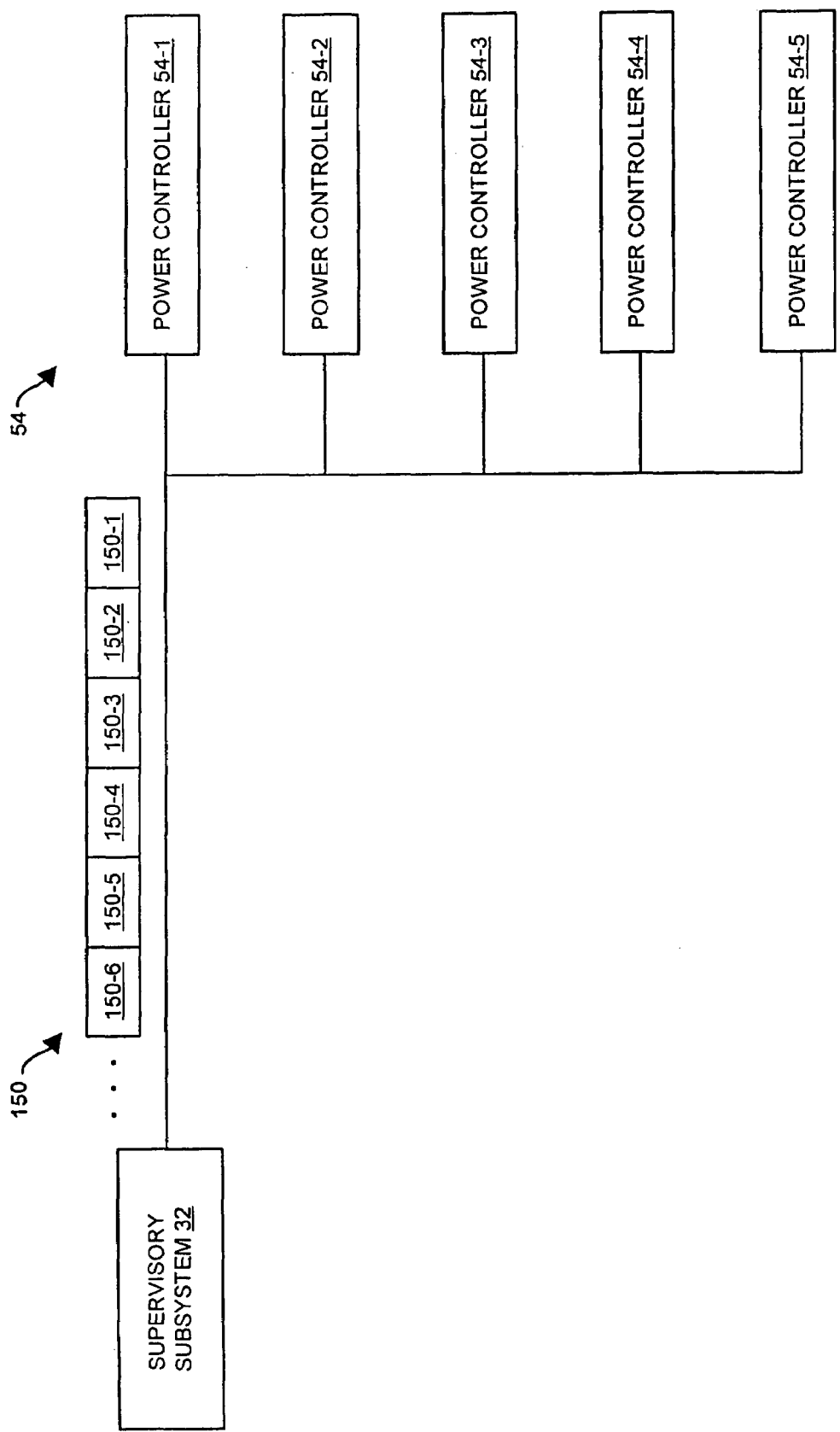
FIG. 9 is a block diagram logically illustrating the supervisory subsystem of the data communications device of FIG. 1 issuing a sequence of transactions to a set of power controllers of the data communications device.

FIG. 9 is a block diagram logically illustrating the supervisory subsystem 32 of the data communications device 22 (i.e., one of the supervisory circuits 140) issuing a sequence of transactions 150-1, . . . , 150-6 (collectively, transactions 150) to a set of power controllers 54-1, . . . , 54-5 of the data communications device 22. Some of the transactions 150 can uniquely address the power controllers 54 individually, while other transactions 150 can globally address the power controllers 54 simultaneously.

The supervisory subsystem 32 communicates with the power controllers 54 through a communication interface (shown as the solid lines connecting the supervisory subsystem 32 and the power controllers 54 together in FIG. 9). It should be understood that a variety of topologies and architectures are suitable for use as the communication interface, and that the communication interface is illustrated simply as a generic interface in FIG. 9. In one arrangement, the communication interface is a simple serial wire. In another arrangement, the communication interface is a shared parallel bus (e.g., a multi drop bus). In another arrangement, the communication interface implements an arbitration scheme (e.g., a blocking round-robin arbitration scheme). In another arrangement, the communication interface includes a network of non-blocking point to point channels. Other topologies and architectures for the communication interface are suitable for use as well.

FIG. 10 is a table 160 diagramming the effect of the sequence of transactions 150 of FIG. 9 on a particular power controller 54-1 of the data communications device 22. By way of example only, the power controller 54-1 is configured to consider communication with the supervisory subsystem 32 to be maintained in response to both global messages (e.g., transactions 150 which write to a global address associated with resetting the counter 60 of the power controller 54-1) and messages uniquely addressing the power controller 54-1 (e.g., transactions 150 which write to a unique address associated with resetting the counter 60 of the power controller 54-1, and other command uniquely directed to the power controller 54-1).

By way of example only, the transaction 150-1 uniquely addresses the power controller 54-1 and is a command to setup registers of the power controller 54-1. The transaction 150-2 uniquely addresses the power controller 54-2 and is a command to setup registers of the power controller 54-2. The transaction 150-3 uniquely address the power controller 150-1 and is a command for the power controller 150-2 to provide power to the data communications port 40 which the power controller 54-1 controls. The transaction 150-4 uniquely addresses the power controller 54-1 and is a command to read status from the power controller 54-1. The transaction 150-5 globally addresses all of the power controllers 54 and is a command directing each power controller 54 to reset its counter 60. The transaction 150-6 uniquely addresses the power controller 54-3 and is a command to setup registers of the power controller 54-3.

Since the power controller 54-1 is configured to consider transactions 150 uniquely addressing the power controller 54-1 to be communication with the supervisory subsystem 32, the power controller 54-1 considers communication to exist with the supervisory subsystem 32 in response to the transaction 150-1 which uniquely addresses the power controller 54-1. However, since the transaction 150-2 uniquely addresses the power controller 54-2 and thus does not address the power controller 54-1, the power controller 54-1 provides no response to the transaction 150-2, and so on. The power controller 54-1 considers transactions 150-3, 150-4 and 150-5 to maintain communication with the supervisory subsystem 32 since these transactions address the power controller 54-1 (e.g., and thus resets the counter 60 of the power controller 54-1 upon receipt of each of these transactions). Since the transaction 150-6 does not address the power controller 54-1, the power controller 54-1 provides no response to the transaction 150-6 (e.g., and thus does not reset the counter 60 in response to the transaction 150-6).

As mentioned above, as long as the counter 60 of the power controller 54-1 does not expire, the power controller 54-1 operates in dependent mode, i.e., under control of the supervisory subsystem 32. In dependent mode, the supervisory subsystem 32 directs the power controller 54-1 whether to provide a power signal to one or more data communications ports 40 associated with the power controller 54-1. However, if the counter 60 of the power controller 54-1 expires, the power controller 54-1 exits dependent mode and operates in independent mode, i.e., in a self-operating mode, where the power controller 54-1 can perform its own discovery or operation based on user pre programmed direction. That is, in independent mode, the power controller 54-1 determines whether to provide the power signal to the one or more data communications ports 40 associated with the power controller 54-1 by itself. When communication with the supervisory subsystem 32 is re-established, the power controller 54-1 can revert back to operating in dependent mode again.

As described above, the invention is directed to techniques for powering a data communications port 40 in response to communication with an external component (e.g., a supervisory subsystem 32 having supervisory circuits 140 on supervisory circuit boards 38). After communication with the external component is lost for a period of time, a power signal can be selectively (i) discontinued (e.g., in order to prevent against inadvertently providing the power signal to a locally powered device 24) or (ii) provided (e.g., in special situations that require the power signal to be maintained at all cost) based on a local parameter. Accordingly, even when the external component fails (e.g., crashes), control over the power signal can be maintained. The features of the invention, as described above, may be employed in computerized systems, components and procedures as well as other computer-related peripherals such as those of Cisco Systems, Inc. of San Jose, Calif.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the invention was described as being implemented in VoIP phone system by way of example only. The invention is suitable for use in other systems as well such as networks, general purpose computer systems, content distribution systems, etc.

Additionally, it should be understood that the power controllers 54 were described above as reverting back to independent mode upon loss of communication with the supervisory subsystem 32 and, when in independent mode, performing discovery and either continuing to provide the power signal or discontinuing the power signal by way of example only. In other arrangements, the power controllers 54 can simply provide the power signal or not provide the power signal when reverting back to independent mode and alleviate the need for performing discovery. These arrangements provide for a simpler or less-sophisticated safeguard mechanism for a lower-cost power controller 54.

Furthermore, it should be understood that the data communications device 22 of FIG. 2 was shown as including 12 line cards 34 with each line card 34 providing four data communications ports 40 by way of example only. Other numbers of line cards 34 (e.g., 2, 4, 6, 8, 10, etc.), other numbers of power controllers 54 and other numbers of data communications ports 40 (e.g., 2, 6, 8, etc.) are suitable for use as well.

Additionally, it should be understood that the circuitry for the controller 54 and of the line card 34 (see FIG. 3) can be implemented in a single IC (e.g., a "hot swap" IC) or distributed in multiple components on the line card 34. Furthermore, it should be understood that such components can include fiber optic interfaces, metallic interfaces (e.g., copper) and combinations thereof.

Moreover, it should be understood that the power controllers 54 of the line cards 34 can be configured to switch back and forth between independent mode and dependent mode many times. For example, when the supervisory subsystem 32 becomes unavailable (e.g., due to multiple supervisory circuit board failures), the power controllers 54 can switch to independent mode in response to lost communication with the supervisory subsystem 32. Later, when the supervisory subsystem 32 becomes available again (e.g., after rebooting), the power controllers 54 can re-enter dependent mode upon re-establishment or receipt of communication with the supervisory subsystem 32 (e.g., once new message uniquely addressing the power controller 54 or a broadcast message to the global address is detected), and so on.

Furthermore, it should be understood that there are operations other than simply providing or not providing a power signal which can be controlled by the power controller 54 when it enters independent mode from dependent mode in response to losing communication with the supervisory subsystem 32. For example, upon entrance into independent mode, the power controller 54 can initiate a signal that would switch to a redundant component or device running as a backup. As another example, upon entrance into independent mode, the power controller 54 can notify a specific external device (e.g., using an IP address) of the loss of communication with the supervisory subsystem 32. As yet another example, upon entrance into independent mode, the power controller 54 can make a phone call. As yet another example, upon entrance into independent mode, the power controller 54-1 can save operating information such as the time, the date, the configuration, the power status, etc. As yet another example, upon entrance into independent mode, the power controller 54-1 can switch to a backup battery system. Such modifications and enhancements are intended to be within the scope of the invention.

What is claimed is:

1. A data communications device, comprising:
   a data communications port to be coupled to a powered device;
   a supervisory circuit; and
   a power controller operative to selectively provide power to the powered device via the data communications port based on whether the power controller is in communication with the supervisory circuit.

2. A data communications device according to claim 1, wherein:
   in response to communication with the supervisory circuit, the power controller operates in a dependent mode in which the power controller provides power to the powered device; and
   upon losing communication with the supervisory circuit for a period of time, the power controller operates in an independent mode in which the power controller selectively provides power to the powered device based on the value of a control parameter.

3. A data communications device according to claim 2, wherein the power controller is further operative to continue operating in the independent mode until communication with the supervisory circuit is restored.

4. A data communications device according to claim 1, wherein the state of communication with the supervisory circuit is established based on whether communication has occurred with the supervisory circuit over a period of time.

5. A data communications device according to claim 1, wherein the data communications port is a first data communications port, the powered device is a first powered device, and the power controller is a first power controller, and further comprising (i) a second data communications port to be coupled to a second powered device, and (ii) a second power controller operative to selectively provide power to the second powered device via the second data communications port based on a state of communication with the supervisory circuit.

6. A data communications device according to claim 5, wherein the supervisory circuit is operative to generate a periodic series of broadcast messages to a global address, and wherein each of the first and second power controllers is operative to respond to each of the broadcast messages by continuing to supply power to the respective powered device for a period of time greater than the period of the periodic series of broadcast messages.

7. A data communications device according to claim 6, wherein each of the first and second power controllers comprises a respective counter for counting from a reset state to an expired state to measure the period of time to continue to supply power to the respective power device, and wherein each of the first and second power controllers is operative to (i) place the respective counter in the reset state upon receiving each of the broadcast messages, and (ii) deem communication with the supervisory circuit to be lost when the counter reaches the expired state.

8. A data communications device according to claim 5, wherein the supervisory circuit is operative to generate respective first and second messages uniquely addressing the first and second power controllers respectively, and wherein each of the first and second power controllers is operative to respond to the respective message by continuing to supply power to the respective powered device for a period of time.

9. A supervisory circuit for use in a data communications device, comprising:
an interface to a power controller in the data communications device, the power controller being operative to selectively provide power to a powered device based on whether the power controller is in communication with the supervisory circuit; and
a control circuit configured to provide a broadcast message to a global address to maintain a state of communication with the power controller.

10. A supervisory circuit according to claim 9, wherein the power controller is operative to respond to each of a periodic series of broadcast messages to the global address by continuing to supply power to the powered device for a period of time greater than the period of the periodic series of broadcast messages, and wherein the supervisory circuit is operative to generate the periodic series of broadcast messages to the global address, the period of the periodic series of broadcast messages being less than the period of time for which the power controller continues to supply power to the respective powered device in response to each of the broadcast messages.

11. A supervisory circuit according to claim 9, wherein the power controller is operative to respond to a message uniquely addressing the power controller by continuing to supply power to the respective powered device for a period of time, and wherein the supervisory circuit is operative to generate the message uniquely addressing the power controller.

12. A method of operating a data communications device, comprising:
coupling a data communications port of the data communications device to a powered device;
operating a supervisory circuit in the data communications device; and
from a power controller in the data communications device, selectively providing power to the powered device via the data communications port based on whether the power controller is in communication with the supervisory circuit.

13. A method according to claim 12, further comprising:
in response to communication with the supervisory circuit, operating the power controller in a dependent mode in which the power controller provides power to the powered device; and
upon losing communication with the supervisory circuit for a period of time, operating the power controller in an independent mode in which the power controller selectively provides power to the powered device based on the value of a control parameter.

14. A method according to claim 13, wherein operating the power controller in the independent mode comprises:
continuing to operate the power controller in the independent mode until communication with the supervisory circuit is restored.

15. A method according to claim 12, wherein the state of communication with the supervisory circuit is established based on whether communication has occurred with the supervisory circuit over a period of time.

16. A method according to claim 12, wherein the data communications port is a first data communications port, the powered device is a first powered device, and the power controller is a first power controller, and further comprising:
coupling a second data communications port of the data communications device to a second powered device; and
by a second power controller in the data communications device, selectively providing power to the second powered device via the second data communications port based on a state of communication with the supervisory circuit.

17. A method according to claim 16, further comprising:
generating a periodic series of broadcast messages to a global address; and
by each of the first and second power controllers, responding to each of the broadcast messages by continuing to supply power to the respective powered device for a period of time greater than the period of the periodic series of broadcast messages.

18. A method according to claim 17, wherein each of the first and second power controllers comprises a respective counter for counting from a reset state to an expired state to measure the period of time to continue to supply power to the respective power device, and further comprising:
by each of the first and second power controllers, (i) placing the respective counter in the reset state upon receiving each of the broadcast messages, and (ii) deeming communication with the supervisory circuit to be lost when the counter reaches the expired state.

19. A method according to claim 16, further comprising:
generating respective first and second messages uniquely addressing the first and second power controllers respectively; and
by each of the first and second power controllers, responding to the respective message by continuing to supply power to the respective powered device for a period of time.

20. A method of operating a supervisory circuit in a data communications device, comprising:
maintaining an interface to a power controller in the data communications device, the power controller being operative to selectively provide power to a powered device based on whether the power controller is in communication with the supervisory circuit; and
providing a broadcast message to a global address to maintain a state of communication with the power controller.

21. A method according to claim 20, wherein the power controller is operative to respond to each of a periodic series of broadcast messages to the global address by continuing to supply power to the powered device for a period of time greater than the period of the periodic series of broadcast messages, and further comprising:

generating the periodic series of broadcast messages to the global address, the period of the periodic series of broadcast messages being less than the period of time for which the power controller continues to supply power to the respective powered device in response to each of the broadcast messages.

22. A method according to claim 20, wherein the power controller is operative to respond to a message uniquely addressing the power controller by continuing to supply power to the respective powered device for a period of time, and further comprising:

generating the message uniquely addressing the power controller.

* * * * *